June 6, 1961          J. R. MILLARD          2,987,148
EXPANSIBLE STRUCTURAL MEMBER
Filed Aug. 26, 1955          2 Sheets-Sheet 1
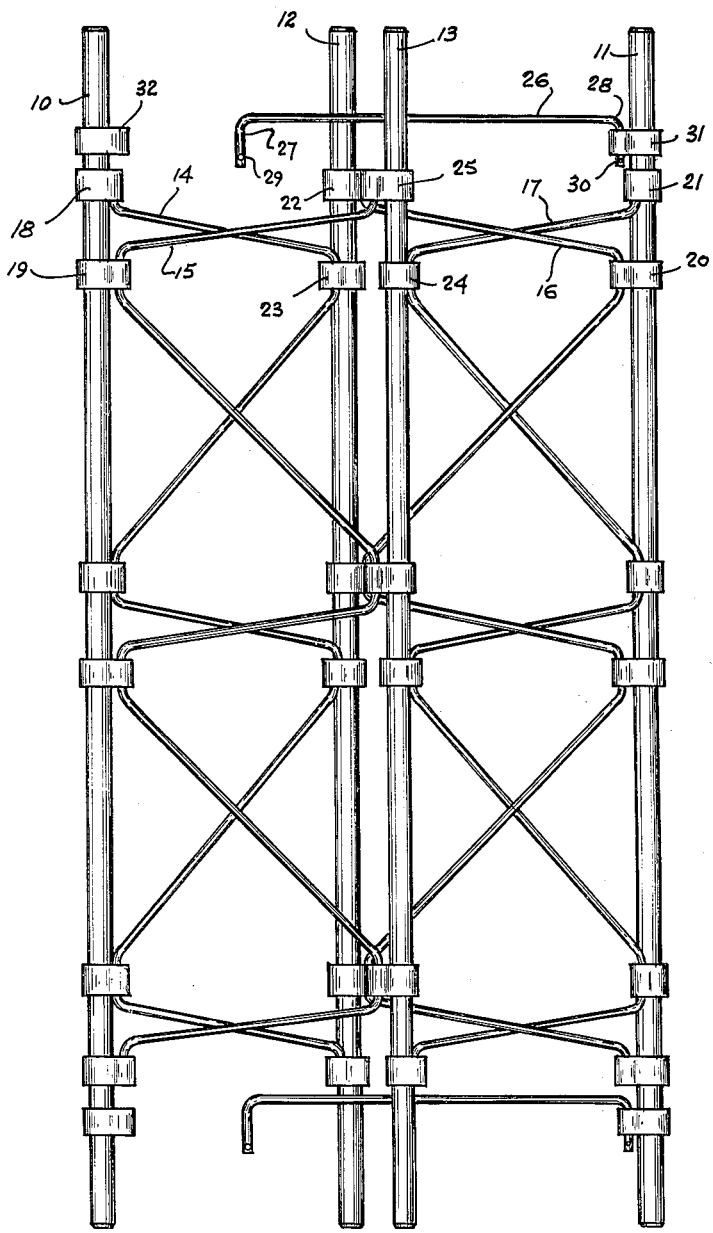
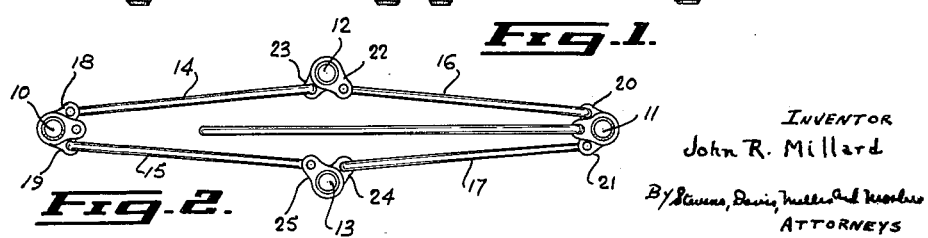
Fig. 1.
Fig. 2.
INVENTOR
John R. Millard
BY Stevens, Davis, Miller and Mosher
ATTORNEYS June 6, 1961 J. R. MILLARD 2,987,148
EXPANSIBLE STRUCTURAL MEMBER
Filed Aug. 26, 1955 2 Sheets-Sheet 2

INVENTOR
John R. Millard
By Stevens, Davis, Miller & Mosher
ATTORNEYS

United States Patent Office 2,987,148
Patented June 6, 1961

2,987,148
EXPANSIBLE STRUCTURAL MEMBER
John Reeson Millard, % Millard Electric,
Perth, Ontario, Canada
Filed Aug. 26, 1955, Ser. No. 530,739
4 Claims. (Cl. 189—13)

This invention relates to an expansible structural member and more particularly to an expansible structural member which is particularly suitable for use as a tower.

The assembly of structural members such as towers at the site at which they are to be erected is a laborious task. However, if the various uprights, cross pieces and the like of a tower are assembled in the factory the savings in the time and cost of assembly are largely offset by the high cost of storage and shipment due to the considerable volume of the assembled structural members.

The object of this invention is to provide a structural member which is simple and practical in construction, which is of unusual rigidity and yet which is extensible from a flat position, in which the structural member takes a relatively small amount of space during storage and transportation, and an expanded position in which the structural member is ready for use.

The manner in which the foregoing is achieved and the scope of this invention will be apparent from the description which follows of the preferred embodiment of this invention and from the appended claims.

In the drawings which illustrate the preferred embodiment of this invention:

FIGURE 1 is an elevation view of a structural member in accordance with this invention when in a flat position.

FIGURE 2 is a plan view of the structural member shown in FIGURE 1.

Referring now to FIGURES 1 and 2 of the drawings which illustrate the structural member in its flat position, the structural member comprises a pair of oppositely disposed rods 10 and 11 and a second pair of oppositely disposed rods 12 and 13 respectively. Rod 10 is connected to rods 12 and 13 by a connnecting means provided by serpentine shaped wires 14 and 15 respectively. Rod 11 is similarly connected to rods 12 and 13 by serpentine shaped wires 16 and 17. Rods 10, 11, 12 and 13 are symmetrically arranged preferably by providing uniform serpentine wires 14, 15, 16 and 17 which equally space the rods of each pair from the rods of the second pair. The axes of the rods are preferably parallel to each other but it would be possible to provide a tapering structure.

Figure 3:
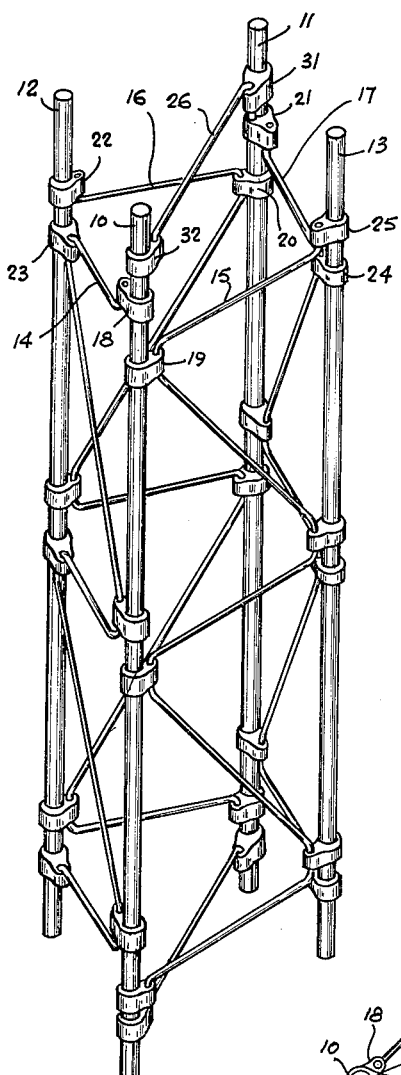
FIGURE 3 is a perspective view of the structural member shown in FIGURES 1 and 2 when in an expanded position.
Figure 4:
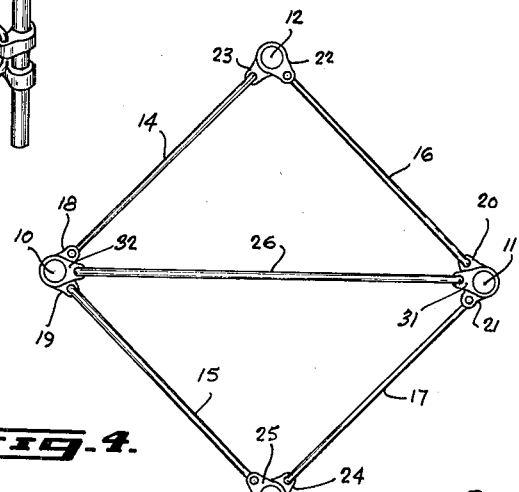
FIGURE 4 is a plan view corresponding to FIGURE 3.

Serpentine wires 14, 15, 16 and 17 are connected to rods 10, 11, 12 and 13 by holding means 18 and 19 for rod 10, 20 and 21 for rod 11, 22 and 23 for rod 12 and 24 and 25 for rod 13. Each of holding means 18 to 25 inclusive is rigidly attached to its respective rod. Holding means 18, 19, 20 and 21 are outwardly directed at a greater angle than that of serpentine wires 14 and 15 so that when the structure is expanded into the position shown in FIGURES 3 and 4, holding members 18, 19, 20 and 21 will be in alignment with serpentine wires 14, 15, 16 and 17. Similarly, holding members 22, 23, 24 and 25 are inwardly inclined at a greater angle of inclination than serpentine wires 14, 15, 16 and 17. The serpentine wires are rotatably engaged by the holding means. This permits rods 12 and 13 to be drawn away from each other to convert the structural member from the flat position shown in FIGURES 1 and 2 to the expanded position shown in FIGURES 3 and 4.

For some purposes it may be unnecessary to provide bracing means to retain the structural member in its expanded position. The main loads may be compressive and the friction between the holding means and the serpentine wire may be sufficient to maintain the structural member in its expanded position. Preferably, however, rigidifying means are engageable to maintain the structural member in its expanded condition. A convenient form of rigidifying means is illustrated in FIGURES 1 to 4 inclusive, namely a diagonally extending wire rod 26 having downwardly bent portions 27 and 28 at each end, these downwardly bent portions being apertured to receive split pins 29 and 30. Securing means for rigidifying bar 26 is provided by holding means 31 and 32 which are similar to the holding means for the serpentine wire. Holding means 31 and 32 rigidly engage a pair of opposite rods 10 and 11 and are apertured to receive portions 27 and 28 of rigidifying rods 26. It will be apparent that the rigidifying rods can readily be inserted in position by locating portions 27 and 28 of rigidifying rods 26 in position in the apertures in holding means 31 and 32 and inserting split pins 29 and 30. It is contemplated that other forms of rigidifying means engageable diagonally to connect opposite pairs of said rods can be used.

Figure 5:
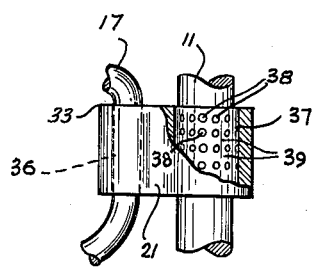
FIGURE 5 is a detailed elevation view partially broken away of one of the holding means used in the structure shown in FIGURES 1 to 4 inclusive.
Figure 6:
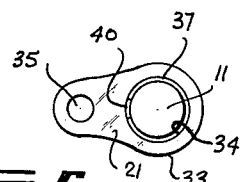
FIGURE 6 is a plan view of the holding means shown in FIGURE 5.

The holding means as exemplified by holding means 21 engaging rod 11 is shown in detail in FIGURES 5 and 6. Holding means 21 comprises a deformable clamping sleeve 33 integrally formed as a solid block and having an aperture 34 to receive rod 11 and a second aperture 35 spaced from aperture 34 to receive a portion 36 of serpentine wire 17. A securing sleeve 37 is provided between rod 11 and the surface of aperture 34. Sleeve 37 is formed as a screen by providing a large number of apertures 38 in a sheet of metal. Apertures 38 leave ribs 39 of the residual metal which becomes embedded both in rod 11 and block 33 when the block is crimped. The metal of sleeve 37 is harder than the metal of block 33, for example sleeve 37 may be made of steel and block 33 of aluminum. Preferably the material of sleeve 37 is also harder than that of rod 11 although, as an alternative, rod 11 could be made from material which is as hard as sleeve 37 provided that indentations were formed in rod 11 to conform with the ribs of sleeve 37. Sleeve 37 is shown as extending part way around rod 11 to leave a space 40 to compensate for the reduction in circumference of sleeve 37 when the block is crimped. The type of screen described above has an advantage over a wire mesh screen that the overlapping wire would require a loose fit between rod 11 and block 33. Both types of screen and particularly the type of screen shown in FIGURES 5 and 6 have the advantage of providing resistance both to relative rotations between block 33 and rod 11 and movement of block 33 axially of rod 11. As an alternative to the screen proposed above a spring or abrasive grit can be used as proposed in application Serial No. 388,243, filed October 26, 1953, by J. R. Millard for Structural Member and application Serial No. 408,923, filed February 8, 1954, for Clamp Construction, now Patent No. 2,837,358, granted June 3, 1958.

Serpentine wire 17 is received within aperture 35 without the use of any securing means such as screen 37. Accordingly, portion 36 of serpentine wire 17 will rotate within aperture 35 to enable the structural member to be expanded. It will be noted that the shape of serpentine wire 17 prevents the serpentine wire from moving upwards or downwards with respect to block 33.

I claim:
1. An expansible tower comprising four symmetrically spaced rods, a rigid serpentine shaped wire extending between each of a pair of oppositely disposed rods and each of a second pair of oppositely disposed rods, holding means rigidly engaging said rods and rotatably engaging said serpentine shaped wires at the points of abutment of the serpentine wires and the rods, said serpentine shaped wires being angularly directed immediately above and below said holding means to prevent relative movement of said serpentine shaped wires with respect to said holding means longitudinally of the axis of said rotational engagement, the rotatable engagement of the serpentine shaped wires with the holding means acting to permit the tower to be expanded from a flat position with the members of one pair of said oppositely disposed rods closely adjacent to each other to an expanded position in which said members of one pair of oppositely disposed rods are spaced a substantial distance from each other and rigidifying means adapted to extend diagonally between at least one of said pairs of oppositely disposed rods when the tower is in expanded position to maintain the tower in said expanded position and releasably engageable means for securing said rigidifying means to said at least one pair of oppositely disposed rods, said holding means comprising a screen encircling each of said rods, a block apertured to receive one of said rods and one of said serpentine shaped wires, said screen being embedded in the material of said block and in the material of said rod.

2. An expansible tower as in claim 1 in which said screen comprises a sheet apertured to provide ribs to provide said screen.

3. An expansible tower as in claim 2 in which the material of said screen is harder than the material from which said block and said rod are formed.

4. An expansible tower comprising four symmetrically spaced rods, a rigid serpentine shaped wire extending between each of a pair of oppositely disposed rods and each of a second pair of oppositely disposed rods, holding means rigidly engaging said rods and rotatably engaging said serpentine shaped wires at the points of abutment of the serpentine wires and the rods, said serpentine shaped wires being angularly directed immediately above and below said holding means to prevent relative moving of said serpentine shaped wires with respect to said holding means longitudinally of the axis of said rotational engagement, the rotatable engagement of the serpentine shaped wires with the holding means acting to permit the tower to be expanded from a flat position with a pair of said oppositely disposed rods closely adjacent to each other to an expanded position in which said pair of oppositely disposed rods are spaced a substantial distance from each other and rigidifying means adapted to extend diagonally between at least one of said pairs of oppositely disposed rods when the tower is in expanded position to maintain the tower in said expanded position and releasably engageable means for securing said rigidifying means to said at least one pair of oppositely disposed rods when said tower is in said expanded position, said holding means comprising a block apertured to receive one of said rods and one of said serpentine shaped wires and means disposed between and comprising material harder than that of said block and rod imbedded in the material of said block and in the material of said rod to prevent relative rotation between said block and said rod.

References Cited in the file of this patent

UNITED STATES PATENTS

| | | |
|---|---|---|
| 170,495 | Saint | Nov. 30, 1875 |
| 435,345 | Cochrane | Aug. 26, 1890 |
| 474,950 | Dodd | May 17, 1892 |
| 946,093 | Altmyer | Jan. 11, 1910 |
| 1,011,104 | Bates | Dec. 5, 1911 |
| 1,172,355 | Guest | Feb. 22, 1916 |
| 1,516,388 | Kruszynski | Nov. 18, 1924 |
| 1,521,422 | Boyd | Dec. 30, 1924 |
| 1,693,839 | Faudi | Dec. 4, 1928 |
| 1,930,285 | Robinson | Oct. 10, 1933 |
| 2,175,983 | Walsh | Oct. 10, 1939 |
| 2,356,708 | Sileck | Aug. 22, 1944 |

FOREIGN PATENTS

| | | |
|---|---|---|
| 221,439 | Germany | Apr. 29, 1910 |
| 802,190 | Germany | Feb. 5, 1951 |
| 13,194 | Great Britain | Nov. 8, 1915 |
| 748,394 | France | July 3, 1933 |